United States Patent
Davis et al.

(10) Patent No.: US 11,340,822 B2
(45) Date of Patent: May 24, 2022

(54) MOVEMENT OF STORED DATA BASED ON OCCURRENCES OF ONE OR MORE N-GRAM STRINGS IN THE STORED DATA

(71) Applicant: EMC IP Holding Company LLC, Hopkinton, MA (US)

(72) Inventors: Sashka T. Davis, Vienna, VA (US); Kevin J. Arunski, Sterling, VA (US)

(73) Assignee: EMC IP Holding Company LLC, Hopkinton, MA (US)

(*) Notice: Subject to any disclaimer, the term of this patent is extended or adjusted under 35 U.S.C. 154(b) by 643 days.

(21) Appl. No.: 16/399,343

(22) Filed: Apr. 30, 2019

(65) Prior Publication Data

US 2020/0349090 A1 Nov. 5, 2020

(51) Int. Cl.
*G06F 3/06* (2006.01)
*G06F 12/127* (2016.01)

(52) U.S. Cl.
CPC .......... *G06F 3/0649* (2013.01); *G06F 3/0608* (2013.01); *G06F 3/0653* (2013.01); *G06F 3/0685* (2013.01); *G06F 12/127* (2013.01)

(58) Field of Classification Search
CPC ....... G06F 3/0608; G06F 3/0647–0649; G06F 3/0685
See application file for complete search history.

(56) References Cited

U.S. PATENT DOCUMENTS

| | | | |
|---|---|---|---|
| 7,644,076 | B1 | 1/2010 | Ramesh et al. |
| 2006/0026372 | A1 | 2/2006 | Kim et al. |
| 2006/0143393 | A1 | 6/2006 | Petev et al. |
| 2009/0063404 | A1 | 3/2009 | Hacigumus et al. |
| 2013/0227218 | A1* | 8/2013 | Chang ................ G06F 12/0866 711/E12.017 |

(Continued)

OTHER PUBLICATIONS

Introduction to N-grams. Article [online], XRDS Crossroads, Oct. 21, 2017 [retrieved on Mar. 7, 2022], Retrieved from the Internet: <https://blog.xrds.acm.org/2017/10/introduction-n-grams-need/> (Year: 2017).*

(Continued)

*Primary Examiner* — Chie Yew
(74) *Attorney, Agent, or Firm* — Ryan, Mason & Lewis, LLP (57) ABSTRACT

A method includes obtaining data from a plurality of data sources associated with an n-gram indexing data structure and storing at least a portion of the obtained data in a first storage, the stored data comprising one or more n-gram strings. The method also includes estimating frequencies of occurrence of respective ones of the n-gram strings in the stored data, the estimated frequency of occurrence of a given n-gram string being based at least in part on a size of a given n-gram index in the n-gram indexing data structure corresponding to the given n-gram string. The method further includes, in response to detecting one or more designated conditions, selecting a portion of the stored data based at least in part on the estimated frequencies and moving the selected portion of the stored data from the first storage to a second storage having different read and write access times.

20 Claims, 4 Drawing Sheets

(56) References Cited

U.S. PATENT DOCUMENTS

2016/0011803 A1* 1/2016 Guo .................... G06F 3/0611
                                                711/114
2017/0336994 A1* 11/2017 Jain .................... G06F 12/1081

OTHER PUBLICATIONS

S. Huston et al., "Efficient Indexing of Repeated n-Grams," Proceedings of the Fourth ACM International Conference on Web Search and Data Mining (WSDM), Feb. 9-12, 2011, pp. 127-136.
T. Hawker et al., "Practical Queries of a Massive n-gram Database," Proceedings of the Australasian Language Technology Workshop, Dec. 10-11, 2007, pp. 40-48, vol. 5.
T. Cormen et al., "Introduction to Algorithms," Third Edition, MIT Press, 2008, 1313 pages.
A. Fiat et al., "Competitive Paging Algorithms," Journal of Algorithms, Dec. 1991, pp. 685-699, vol. 12, No. 4.
U.S. Appl. No. 16/176,890 filed in the name of Kevin J. Arunski et al. Oct. 31, 2018 and entitled "Addressable Array Indexing Data Structure for Efficient Query Operations."

\* cited by examiner

FIG. 4

MOVEMENT OF STORED DATA BASED ON OCCURRENCES OF ONE OR MORE N-GRAM STRINGS IN THE STORED DATA

FIELD

The field relates generally to information processing, and more particularly to managing data in information processing systems.

BACKGROUND

An operating system may use paging for virtual memory management. For virtual memory management, a computing device utilizes a portion of a disk or other storage device as "virtual" memory. The disk or other storage device will typically have read and write access times that are orders of magnitude more expensive, in terms of time, than physical memory. Over time, the physical memory may become full and data, in the form of pages, is evicted or flushed from the physical memory to the portion of the disk or other storage device providing the virtual memory. Operating systems that use paging for virtual memory management utilize a page replacement algorithm for determining when to evict or flush pages from physical memory to the portion of a disk or other storage device providing virtual memory, and conversely for determining which pages to keep in the physical memory.

SUMMARY

Illustrative embodiments of the present invention provide techniques for movement of stored data between different types of storage based at least in part on the sizes of indexes in an indexing data structure maintained for the stored data. Embodiments advantageously improve the efficiency of a system storing the data by learning the distribution of data being stored based on the sizes of indexes corresponding to the stored data and moving data from relatively fast storage to relatively slow storage based on the learned distribution.

In one embodiment, a method comprises obtaining data from a plurality of data sources in an enterprise system, the obtained data being associated with an n-gram indexing data structure. The method also comprises storing at least a portion of the obtained data from the plurality of data sources in a first storage having a first set of read and write access times, the stored data comprising one or more n-gram strings. The method further comprises estimating frequencies of occurrence of respective ones of the one or more n-gram strings in the stored data, the estimated frequency of occurrence of a given n-gram string being based at least in part on a size of a given n-gram index in the n-gram indexing data structure corresponding to the given n-gram string. The method further comprises, in response to detecting one or more designated conditions, selecting a portion of the stored data based at least in part on the estimated frequencies of occurrence of the one or more n-gram strings and moving the selected portion of the stored data from the first storage having the first set of read and write access times to a second storage having a second set of read and write access times slower than the first set of read and write access times. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Most modern operating systems (OSes) implement a virtual memory solution that provides transparent access by user processes to memory that exceeds the capacity of physical random access memory (RAM). The OS manages the allocation of storage for the virtual memory (e.g., where the storage may be a disk or storage device with a larger capacity but with read and write access times that are orders of magnitude more expensive than RAM). The OS also manages the organization of physical RAM and implements a page replacement algorithm for deciding what data (e.g., "pages") should remain in RAM and what data or pages should be flushed to disk (e.g., evicted or paged out) when information requested by a running process is not found in RAM (e.g., on page miss).

An OS may use a last recently used (LRU) algorithm to implement a page replacement strategy to address what is referred to herein as the "paging problem." The paging problem is defined as follows: given a fixed amount of RAM and an a priori unknown sequence of memory requests, design an algorithm that processes the sequence of memory requests at a minimum cost. The cost may be measured as the number of page misses incurred by the paging algorithm.

The paging problem is important for OS design as the optimality of the paging algorithm is directly related to the running time of all processes in the system. Serving memory requests that result in swapping in and out pages from storage is orders of magnitude more expensive (e.g., in terms of time) than serving requests to data that is in RAM. The paging problem may be viewed as an online optimization problem, and the competitive ratio (e.g., used in competitive analysis of online problems) of many algorithms has been analyzed.

One page replacement strategy is the LRU algorithm. The LRU algorithm implements a competitive online strategy for read and write requests generated by running programs or processes to pages (e.g., instructions and data). LRU strategies match, on average, the spatial and temporal locality of requests exhibited by running processes. Running processes, other than certain kinds of benchmarking processes, do not generally generate adversarial sequences of memory requests. Processes instead run instructions in basic blocks (e.g., with spatial locality) and also tend to manipulate the same data in a given period of time (e.g., temporal locality). While locality of reference is a principle that programs' requests to memory satisfy, writing and reading enormous amounts of data records generated by independent devices that exceeds the capacity of the physical RAM may not conform to the locality of reference principle.

LRU performs well when read and write requests obey the principle of locality of reference, where memory requests generated by most running processes, on average, exhibit spatial and temporal locality. LRU, however, does not perform as well in cases where read and write requests are generated by a large number of external and independent applications. Examples of such systems include network traffic and log message concentrators, large scale systems with device monitoring processes and a central repository, etc.

Embodiments provide an improved solution to the above-described paging problem utilizing a custom paging policy algorithm that learns alternative distributions of memory requests to minimize the cost of paging. The algorithms used in some embodiments can also enforce prioritization for the collection, storage and retention of data. Conversely, some embodiments can also be used for more efficient eviction or "forgetting" of data that satisfy designated constraints, properties and policies. In some embodiments, a paging policy algorithm is designed to be useful for storage and retention of data that is: (i) generated by independent devices, where LRU is observed to be inferior; (ii) conforms to a designated set of policies; and (iii) prioritizes eviction, storage and retention based on a designated set of priorities.

Figure 1:
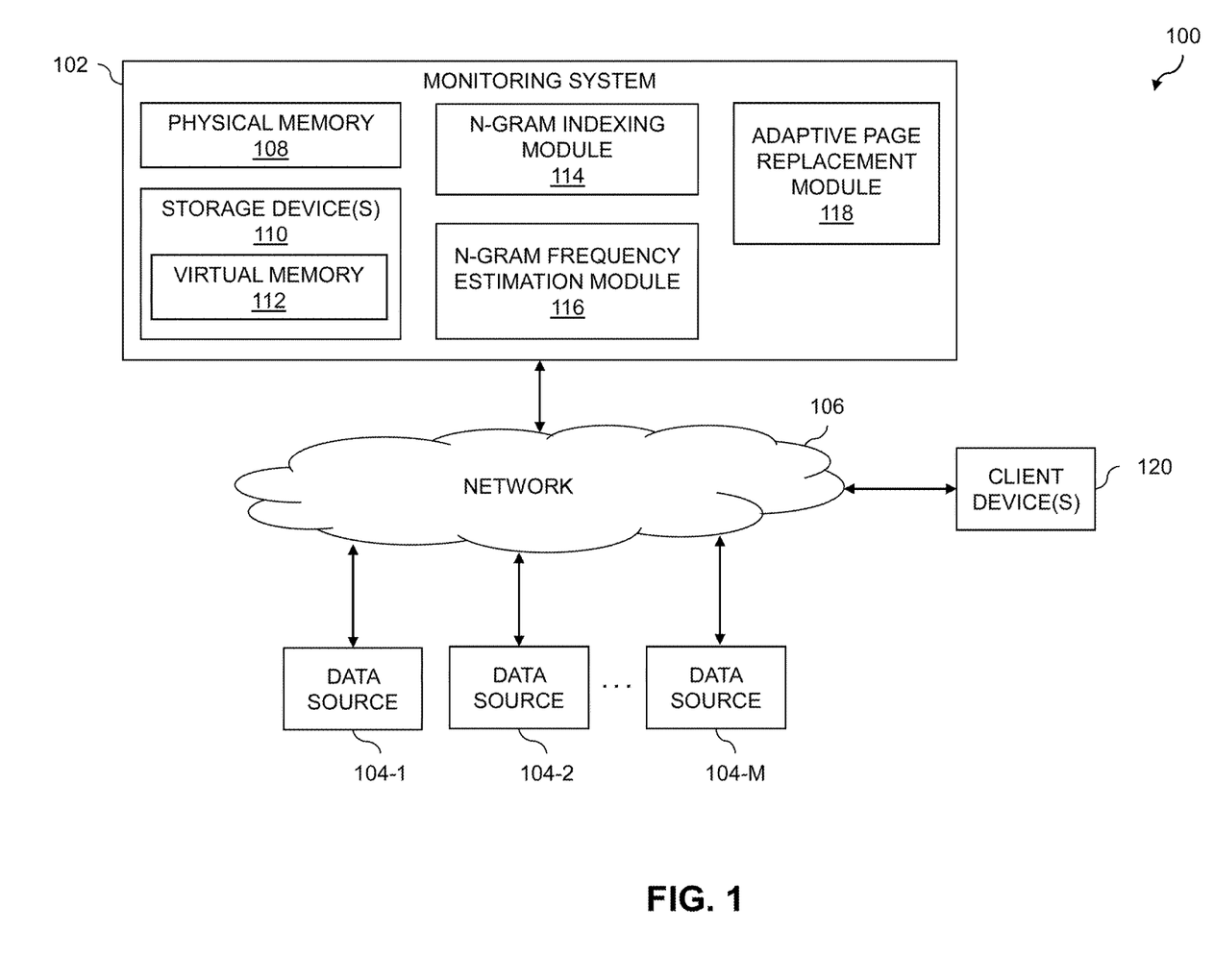
FIG. 1 is a block diagram of an information processing system for movement of data between different types of storage based at least in part on the sizes of indexes in an indexing data structure maintained for the stored data in an illustrative embodiment of the invention.

FIG. 1 shows an information processing system 100 configured in accordance with an illustrative embodiment. The information processing system 100 is assumed to be built on at least one processing platform and provides functionality for movement of data between different types of storage based at least in part on the sizes of indexes in an indexing data structure maintained for the stored data as described in further detail below.

In the FIG. 1 embodiment, a monitoring system 102 receives data from a plurality of data sources 104-1, 104-2, . . . 104-M (collectively, data sources 104) over a network 106. The data sources 104 may be respective computing devices, applications or programs running on one or more computing devices, etc. In some embodiments, the data sources 104 are assumed to be independent, such that reading and writing of data records from the data sources in the monitoring system 102 does not necessarily conform to the principle of locality of reference as described above.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The monitoring system 102 may be part of or comprise an enterprise security operations center (SOC) that monitors an enterprise system comprising a plurality of assets, where the assets provide the data sources 104. The assets of an enterprise system may include, by way of example, physical and virtual computing resources in the enterprise system. Physical computing resources may include physical hardware such as servers, storage systems, networking equipment, Internet of Things (IoT) devices, other types of processing and computing devices, etc. Virtual computing resources may include virtual machines (VMs), containers, etc. The monitoring system 102 may further or alternatively comprise a threat detection and remediation system.

The data sources 104, as noted above, may be physical computing devices or applications running on physical computing devices. Examples of physical computing devices include IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The data sources 104 may also or alternatively comprise virtualized computing resources, such as VMs, containers, etc.

The data sources 104 in some embodiments comprise respective physical and/or virtualized computing resources associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The data sources 104 may be associated with an enterprise system. The enterprise system may comprise IT infrastructure of an enterprise, including but not limited to physical infrastructure such as a data center, combinations of physical and virtual infrastructure such as a software-defined data center, a cloud computing infrastructure, etc. The plurality of assets may comprise physical or virtual computing resources, such as servers, storage systems, virtual machines, containers, etc.

In some embodiments, the monitoring system 102 provides a SOC or threat detection and remediation system that monitors data sources 104 in one or more enterprise systems for security threats. An example of such a monitoring system is the RSA NetWitness® system available from Dell EMC, which may be suitably modified to provide the functionality described herein. The monitoring system 102 may also or alternatively comprise a log concentrator that is configured to obtain network traffic and message logs from a plurality of independent data sources 104. The monitoring system 102 may also or alternatively be part of a critical incident response center (CIRC), a security analytics system, a security information and event management (SIEM) system, a Governance, Risk and Compliance (GRC) system, etc. More generally, the monitoring system 102 is assumed to comprise or provide a central data repository for data from multiple independent data sources 104.

In some embodiments, the monitoring system 102 generates alerts and notifications that are provided over network 106 to client devices 120, or to a system administrator, information technology (IT) manager, or other authorized personnel via one or more security or host agents. Such security or host agents may be implemented via computing or processing devices associated with a system administrator, IT manager or other authorized personnel. Such devices can illustratively comprise mobile telephones, laptop computers, tablet computers, desktop computers, or other types of computers or processing devices configured for communication over network 106 with the monitoring system 102. For example, a given security or host agent may comprise a mobile telephone equipped with a mobile application configured to receive alerts from the monitoring system 102 and to provide an interface for the security agent to select particular remedial measures for responding to the alert or notification. Examples of such remedial measures may include blocking access by one or more client devices 120 to an enterprise system (e.g., to one or more of the data sources 104 or to assets in the enterprise system that are associated with one or more of the data sources), requiring user input or authentication by the client devices 120 to obtain information from or otherwise utilize one or more assets of the enterprise system, triggering further review of the enterprise system or assets thereof, etc.

It should be noted that a "security agent" or "host agent" as these terms are generally used herein may comprise an automated entity, such as a software entity running on a processing device. Accordingly, a security agent or host agent need not be a human entity.

The monitoring system 102 in the FIG. 1 embodiment is assumed to be implemented using at least one processing device. Each such processing device generally comprises at least one processor and an associated memory, and implements one or more functional modules for controlling certain features of the monitoring system 102. In the FIG. 1 embodiment, the monitoring system 102 includes physical memory 108 as well as one or more storage devices 110 implementing virtual memory 112 to provide a virtual memory system for an OS running on the monitoring system 102. The physical memory 108 is assumed to have read and write access times that are faster than that of the storage devices 110. For example, the physical memory may comprise RAM while the storage devices 110 may comprise hard disk drives (HDDs), solid state drives (SSDs), etc. In some embodiments, the storage devices 110 are part of a storage system, where the storage system may comprise a storage array such as a scale-out all-flash content addressable storage array such as an XtremIO™ storage array from Dell EMC of Hopkinton, Mass. Other types of storage arrays, including by way of example VNX® , Symmetrix VMAX®, and PowerMAX storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the monitoring system 102, as well as to support communication between the monitoring system 102 and other related systems and devices not explicitly shown.

The monitoring system 102 further includes an n-gram indexing module 114, an n-gram frequency estimation module 116, and an adaptive page replacement module 118.

The monitoring system 102, as discussed above, is configured to receive data from the data sources 104. The obtained data is assumed to be associated with an n-gram indexing structure that is maintained by the n-gram indexing module 114. The monitoring system 102 stores at least a portion of the data obtained from the data sources 104 in the physical memory 108. The physical memory 108 is an example of what is more generally referred to herein as a first storage with a first set of read and write access times, while the storage devices 110 are an example of what is more generally referred to as a second storage with a second set of read and write access times slower than the first set of read and write access times. The data stored in the physical memory 108 may be in the form of data pages each comprising one or more n-gram strings.

The n-gram frequency estimation module 116 is configured to learn a distribution of the stored data by estimating frequencies of occurrence of respective ones of the one or more n-grams in the stored data. In some embodiments, the frequencies are estimated utilizing the n-gram indexing structure maintained by the n-gram indexing module 114. Thus, the frequency of occurrence of a given n-gram string may be estimated based at least in part on a size of given n-gram index in the n-gram indexing data structure corresponding to the given n-gram string. As the n-gram indexing data structure in some embodiments is already maintained by the monitoring system 102 (e.g., for efficient searching or querying), no additional resources are expended to independently "count" the number of occurrences of different n-gram strings.

The adaptive page replacement module 118 is configured to detect one or more designated conditions (e.g., determining that free space in the physical memory 108 is below some predefined threshold), and to select a portion of the data stored in the physical memory 108. This selection is based on the estimated frequencies of occurrence of n-gram strings in the stored data determined by the n-gram frequency estimation module 116. The adaptive page replacement module 118 is further configured to move the selected portion of the stored data from the physical memory 108 to the virtual memory 112 provided by the storage devices 110 (e.g., by "evicting" data pages stored in the physical memory 108 to the virtual memory 112).

The data stored by the monitoring system 102 may be accessed by one or more client devices 120. The client devices 120, for example, may be operated or utilized by analysts that query the stored data. The selection of stored data to move between the physical memory 108 and the virtual memory 112, in some embodiments, may be based at least in part on access patterns of the client devices 120 to data stored by the monitoring system 102.

It is to be appreciated that the particular arrangement of the monitoring system 102, physical memory 108, storage devices 110, virtual memory 112, n-gram indexing module 114, n-gram frequency estimation module 116 and adaptive page replacement module 118 illustrated in the FIG. 1 embodiment is presented by way of example only, and alternative arrangements can be used in other embodiments. For example, the functionality associated with the n-gram indexing module 114, n-gram frequency estimation module 116 and adaptive page replacement module 118 may be combined into one module, or separated across more than three modules with the multiple modules possibly being implemented with multiple distinct processors or processing devices.

At least portions of the n-gram indexing module 114, n-gram frequency estimation module 116 and adaptive page replacement module 118 may be implemented at least in part in the form of software that is stored in memory and executed by a processor.

It is to be understood that the particular set of elements shown in FIG. 1 for movement of data between different types of storage based at least in part on the sizes of indexes in an indexing data structure maintained for the stored data is presented by way of illustrative example only, and in other embodiments additional or alternative elements may be used. Thus, another embodiment may include additional or alternative systems, devices and other network entities, as well as different arrangements of modules and other components.

The monitoring system 102 and other portions of the system 100, as will be described in further detail below, may be part of cloud infrastructure such as an Amazon Web Services (AWS) system. Other examples of cloud-based systems that can be used to provide the monitoring system 102 include Virtustream Enterprise Cloud, Virtustream Storage Cloud, Google Cloud Platform (GCP) and Microsoft Azure.

The monitoring system 102 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The monitoring system 102 or components thereof (e.g., the n-gram indexing module 114, n-gram frequency estimation module 116 and adaptive page replacement module 118) may be implemented on respective distinct processing platforms, although numerous other arrangements are possible. For example, although shown as external to the monitoring system 102 in FIG. 1, one or more of the data sources 104 may be internal to the monitoring system 102 (e.g., an application, program or process that is running on the monitoring system 102).

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the monitoring system 102 and data sources 104 or portions or components thereof, to reside in different data centers. Numerous other distributed implementations are possible.

The monitoring system 102 can also be implemented in a distributed manner across multiple data centers.

Additional examples of processing platforms utilized to implement the monitoring system 102 in illustrative embodiments will be described in more detail below in conjunction with FIGS. 3 and 4.

It is to be appreciated that these and other features of illustrative embodiments are presented by way of example only, and should not be construed as limiting in any way.

Figure 2:
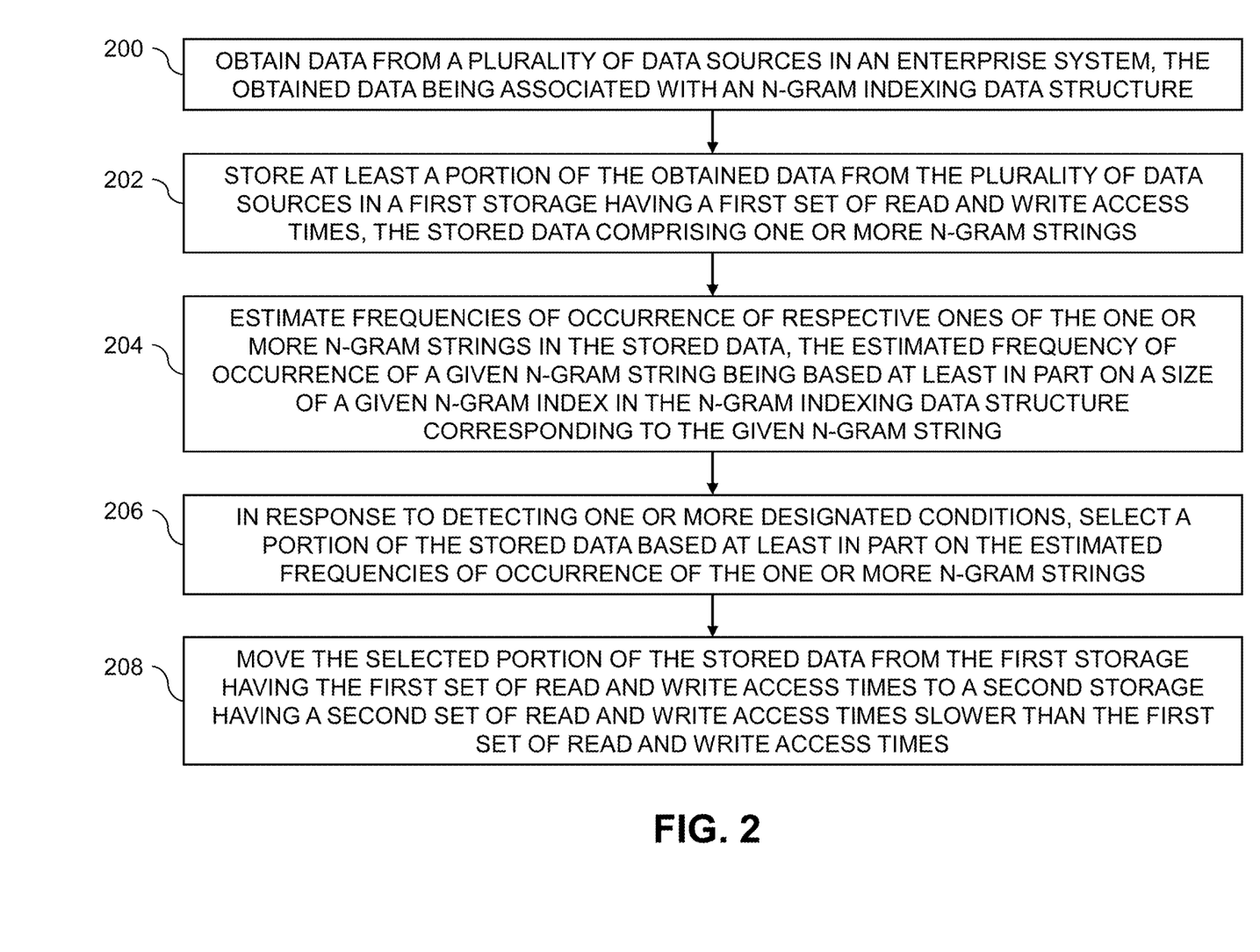
FIG. 2 is a flow diagram of an exemplary process for movement of data between different types of storage based at least in part on the sizes of indexes in an indexing data structure maintained for the stored data in processing nodes in an illustrative embodiment.

An exemplary process for movement of data between different types of storage based at least in part on the sizes of indexes in an indexing data structure maintained for the stored data will now be described in more detail with reference to the flow diagram of FIG. 2. It is to be understood that this particular process is only an example, and that additional or alternative processes for movement of data between different types of storage based at least in part on the sizes of indexes in an indexing data structure maintained for the stored data can be carried out in other embodiments.

In this embodiment, the process includes steps 200 through 208. These steps are assumed to be performed by the threat detection and remediation system 112 utilizing the n-gram indexing module 114, n-gram frequency estimation module 116 and adaptive page replacement module 118. The process begins with step 200, obtaining data from a plurality of data sources in an enterprise system. The obtained data is associated with an n-gram indexing data structure. In some embodiments, the n-gram indexing data structure is assumed to be maintained for efficient query operations. The plurality of data sources may be associated with one or more assets in an enterprise system monitored by a monitoring system. The assets may comprise at least one of physical and virtual computing resources. The plurality of data sources may be considered independent, in that data obtained from the plurality of data sources does not necessarily conform to the locality of reference principle. The data obtained from the plurality of data sources may comprise a plurality of log messages collected by a log message concentrator.

In step 202, at least a portion of the data obtained in step 200 is stored in a first storage having a first set of read and write access times. The first storage may comprise, for example, physical memory such as RAM. The stored data comprises one or more n-gram strings. In step 204, frequencies of occurrence of respective ones of the one or more n-gram strings in the data stored in step 202 are estimated. The frequency of occurrence of a given n-gram string may be estimated based at least in part on a size of a given n-gram index in the n-gram indexing data structure corresponding to the given n-gram string.

In response to detecting one or more designated conditions, a portion of the stored data is selected in step 206. The portion of data selected in step 206 is based at least in part on the estimated frequencies of occurrence of the one or more n-gram strings in the stored data. In step 208, the selected portion of the stored data is moved from the first storage having the first set of read and write access times to a second storage having a second set of read and write access times slower than the first set of read and write access times. The second storage may comprise, for example, one or more storage devices at least a portion of which is designated for providing virtual memory by an operating system that implements a virtual memory system.

The one or more designated conditions may comprise determining that free space in the first storage is below a first threshold. As noted above, the first storage may comprise physical memory such as RAM while the second storage may comprise one or more designated portions of one or more storage devices providing virtual memory for a virtual memory system implemented by an operating system. Determining that the free space in the first storage is below the first threshold may comprise determining that a portion of the physical memory allocated for storage of the obtained data from the plurality of data sources is full. Step 206 may include selecting one or more data pages in the physical memory comprising n-gram strings with estimated frequencies below a second threshold, and step 208 may include evicting the selected one or more data pages from the physical memory to the virtual memory. In some embodiments, the distribution of n-gram strings in the obtained data from the plurality of data sources is non-uniform, and the second threshold is set based at least in part on learning the distribution of the n-gram strings in the obtained data from the estimated frequencies of occurrence of the one or more n-gram strings. The second threshold may comprise an estimated frequency of less than two (e.g., n-grams with an estimated frequency of one).

In some embodiments, the FIG. 2 process further includes maintaining a hash table of data pages in the first storage comprising n-gram strings with estimated frequencies below a first threshold. In such embodiments, step 206 may include selecting one or more of the data pages in the hash table and step 208 may include evicting the selected one or more data pages from the first storage to the second storage and removing the evicted one or more data pages from the hash table. The one or more designated conditions may comprise determining that a size of the hash table exceeds a second threshold.

Step 206 in some embodiments is further based at least in part on access patterns to the stored data by one or more client devices. As discussed in further detail below, the stored data may be accessed or read by various client devices that may be separate from the data sources. Each client device may query the stored data and create a local copy of result sets from such querying. Further querying may be based at least in part on the local copy of a result set. As different client devices may have different result sets, step 206 in some embodiments may seek to learn the access pattern by different client devices so as to learn the length of dependent queries and the length of time for caching result sets.

As discussed above, LRU algorithms are often implemented by OSes to address the paging problem. Various other online paging algorithms may be used, but most are shown to be suboptimal in the general case leading to the wide adoption of LRU. LRU, however, is not optimal for certain types of systems.

The RSA NetWitness® system, for example, may utilize an index storage for which LRU is not optimal. To address OS paging policy deficiencies in systems like RSA NetWitness®, one option is to favor keeping pages resident when they were written to in files that correspond to recently ingested data. Such an approach, however, favors recently written data only with no preference given to how often the values inside a file are accessed. Furthermore, such an approach has a file-level granularity only with no ability to apply paging to smaller regions within the file.

In some embodiments, a custom paging algorithm is used that learns the distribution of the data being stored and evicts the least likely page with respect to the distribution of data. The custom paging algorithm is further able to implement policy and priority driven paging. The custom paging algorithm described herein may be applied to the collection, storage and retention of data in a manner similar to the way in which it is applied to the paging problem for eviction of data from memory.

The custom paging algorithm provides various improvements and efficiencies in systems such as log concentrators, packet decoders, transaction processing systems, monitoring systems, etc. that manage the storage, update and retrieval of messages generated by a large collection of independent devices and/or applications. As noted above, LRU assumes spatial and temporal locality in making eviction decisions. Spatial and temporal locality assumptions, however, do not apply to systems such as those described above that handle data generated by independent devices and/or applications. The speed and efficiency of such systems is directly related to the optimal utilization of available memory.

An implementation of the custom paging algorithm used in some embodiments will now be described with respect to use in a log and packet concentrator system (e.g., which may be used in or by an RSA NetWitness® system suitably modified as described herein). The use case of interest is update, insert and search operations on large numbers (e.g., millions) of n-gram indexes by the log concentrator. Log messages generated by many different devices and applications are processed by a single log concentrator. Requests for reading the log message data, however, may be generated by a different set of devices and applications, also referred to herein as processes.

The index associated with a given n-gram stores a reference to all records that contain the n-gram string. Various data management systems, including transaction processing systems, log decoders and concentrators, network traffic monitoring systems, etc., utilize "big data" in that they process data with high velocity, volume, variety, value and veracity. In some data management systems, it is important to implement efficient search and update indexing mechanisms. For example, a large enterprise could implement centralized processing of all log messages generated by software and/or hardware appliances in the enterprise network. Each log message may capture information about an event in the enterprise system. The ability to efficiently query the log processing system therefore equates with the ability to monitor and triage the events that occur inside the enterprise system. An intrusion detection system may require streaming processing and indexing of log messages, possibly in addition to traffic monitoring, while an incidence response team may require search and other query access of an extremely vast collection of data to analyze the state of a system over time. In these and other situations, a security operation center analyst may need to retrieve and examine all logs or other records containing a specific string of interest or other potential indicator of compromise. To make this feasible, the system needs to support efficient search and other query of messages with an arbitrary structure and length.

Thus, data management systems may generate an indexing data structure that supports efficient search and other query mechanisms for regular expression match of strings that appear anywhere in a message or log for efficient retrieval of relevant records or other data. In some embodiments, no assumptions are made regarding the structure of the messages or logs, and the query string can have an arbitrary length. Further, some embodiments suppose that the query string can appear not only at word boundaries as a prefix or suffix, but at any arbitrary location inside a larger superstring.

One way to support such functionality is to generate n-gram indexes for all records in the system. An n-gram is a continuous sequence of n items. Each item can be a character, a byte value, an entire word, etc. In some embodiments, n-grams are considered to be sequences of n Universal Text Format (UTF) characters (e.g., UTF-8, UTF-16, etc.). It should be appreciated, however, that the techniques described herein may be used for other types of n-grams.

Consider, for example, the message: Imagination is more important than knowledge. The 3-character n-grams in this message include: ima, mag, agi, gin, ina, nat, etc. The 4-character n-grams in this message include: imag, magi, agin, gina, that, nati, etc. The 5-character n-grams in this message include: imagi, magin, agina, ginat, inat, natio, etc. For every n-gram that appears in a collection of documents or other records, the corresponding n-gram index will contain a reference (e.g., a unique identifier) of each record that contains the corresponding n-gram.

It is assumed in some embodiments that an n-gram indexing data structure is maintained for data that is obtained and stored in a data management system. Examples of techniques for generating an n-gram indexing data structure are disclosed in U.S. patent application Ser. No. 16/176,890, filed Oct. 31, 2018 and entitled "Addressable Array Indexing Data Structure for Efficient Query Operations," which is incorporated by reference herein.

The distribution of the frequencies of the n-gram strings processed by log concentrators may be highly non-uniform. In some log concentrator systems, for example, it is observed that 1% of n-gram strings have frequencies of occurrence that are 6 orders of magnitude higher than 95% of the remaining n-grams. The frequency of occurrence of an n-gram string in a log concentrator system corresponds to requests for write and update of the index, because the write requests are generated by hardware and software appliance log messages sent to the concentrator.

It is further observed that in some log concentrator systems 44% of n-gram strings have a frequency of exactly 1. On this distribution (e.g., of frequencies for writing), LRU page replacement algorithms will make the mistake of retaining pages of frequency 1 (e.g., which may be 44% of all indexes) that are created but never or rarely used. An LRU page replacement algorithm will keep those pages in RAM until they become old enough to be evicted, even though such pages will never be used. This distribution is described by the frequencies of the n-grams. Here, LRU is suboptimal because it will retain the least frequently used indexes when they are written to for longer than necessary. It should be noted that LRU will retain the "heavy-hitters" in the distribution and thus may provide reasonable performance. The problem with LRU, however, is that it will keep in memory pages that once written will never or rarely be written to again. LRU will not only keep such pages in memory, but will keep such pages in memory for longer than necessary and is thus inferior to the custom replacement algorithm described herein.

The custom replacement algorithm used in some embodiments utilizes an eviction strategy that uses the distribution of data values, where the distribution is approximated by the frequencies of n-grams. Advantageously, it is not required to maintain frequency counts for different n-gram indexes, as the frequency count for the n-gram indexes are approximated by the size of the corresponding indexes. Thus, "counting" the frequency comes for free from the data structure utilized. For this case (e.g., n-gram indexes), the custom replacement algorithm implements a paging strategy that evicts the index with the lowest frequency count regardless of how recently it was used, and is thus superior to LRU.

When read and write requests are generated by many independent devices or applications, LRU will likely be suboptimal as it is the case for the n-gram indexes populated by the independent devices or applications. Some embodiments learn the distribution (e.g., counts, frequencies, etc.) of the values stored in memory and evict not the least recently used but the least likely to be used with respect to the distribution.

Programmatically, the custom page replacement algorithm used in some embodiments may be implemented by flushing, from memory to disk or storage, regions of the dynamically allocated memory that store data sampled from the tails of the distribution of data values. In the RSA NetWitness® system, for example, indexes that correspond to n-grams with a count below some designated threshold are flushed to disk or storage, even if such n-grams have just been created or updated. As noted above, 44% of the n-gram indexes in some cases may be created but are never or rarely used, and a remaining approximately 50% may have a low frequency count. Performance is improved by evicting such indexes from memory and flushing to disk or storage.

To implement heuristics used for the custom replacement algorithm, it is not necessary to keep track of the counts or frequencies of the number of writes to each n-gram index. For the RSA NetWitness® system, as an example, such frequencies are readily available and may be approximated based on the sizes of the n-gram indexes and so may be implemented at no extra cost (e.g., in terms of time or computing resources) and with no extra bookkeeping.

In the case of a NetWitness® decoder, the distribution between reads and writes is highly skewed in favor of writes. The decoder in such a system may receive 30,000 events per second. To address the case for custom policy for the reads, some embodiments learn a separate policy, which is effectively learning a separate distribution. Some embodiments apply the approach recursively, meaning that it is tailored for a specific application. For each individual analyst or reader of the data, some embodiments assume that each analyst will query the data and create a local copy of the results sets. The analyst pivots further on the result set of previous actions. The tailored solution utilized in some embodiments learns access patterns, considering the local view of the data for a particular analyst or group of analysts. Learning the access patterns includes learning the length of the dependent queries, which translates to the length of time for caching results sets that may vary for different analysts.

An n-gram indexing system may be highly skewed, with a large amount of rarely used n-grams. In such cases, some embodiments replace a LRU page replacement strategy with a least frequently used page replacement strategy that does not require keeping counts or otherwise tracking the frequency of n-grams. The structure of the n-gram indexing system is instead used, where the size of a corresponding n-gram index is used to approximate the frequency or count of an n-gram. In this manner, some embodiments are able to give a boost to terms or n-grams with fetches and reads while punishing LRU terms unless they are actually used.

In some embodiments, a hash table is maintained for low frequency n-grams (e.g., n-grams with a frequency or corresponding index whose size is below a designated threshold). Once an n-gram or n-gram index is flushed from memory to disk or storage, it may be deleted from the hash table. The size of the hash table represents the amount of space in memory that is taken up by low frequency n-grams, and thus may be used as a heuristic for triggering a flushing operation (e.g., when the size of the hash table exceeds a designated threshold).

In other embodiments, multiple hash tables may be maintained. For example, a hash table for "high" frequency n-grams (e.g., n-grams with a frequency or corresponding index size above a designated threshold) and a hash table for "low" frequency n-grams (e.g., n-grams with a frequency or corresponding index size below a designated threshold) may be maintained. This may be extended to include more hash tables if desired, such as three hash tables for low, medium and high frequency n-grams according to designated thresholds or threshold ranges. N-grams in the different hash tables are candidates for eviction, starting with n-grams in the low frequency n-gram hash table, and continuing with n-grams in hash tables corresponding to more frequently used n-grams (e.g., a medium frequency n-gram hash table, a high frequency n-gram hash table, etc.). Within a given hash table, n-grams may be evicted using a LRU strategy if desired.

In some embodiments, as noted above, it is desired to avoid maintaining counts for different n-grams. Once the memory is full, candidates for eviction are determined by analyzing the n-grams currently stored in memory. The n-gram indexing structure may be queried to get the size of indexes corresponding to the n-grams that are currently stored in memory, and the sizes of the corresponding indexes are then used to determine which n-grams should be evicted and flushed to disk or storage. To speed this process up, some embodiments may utilize hash tables as described above to maintain a list of candidates for eviction (e.g., in the low frequency n-gram hash table) to avoid queries to the n-gram indexing structure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for movement of data between different types of storage based at least in part on the sizes of indexes in an indexing data structure maintained for the stored data will now be described in greater detail with reference to FIGS. 3 and 4. Although described in the context of system 100, these platforms may also be used to implement at least portions of other information processing systems in other embodiments.

Figure 3:
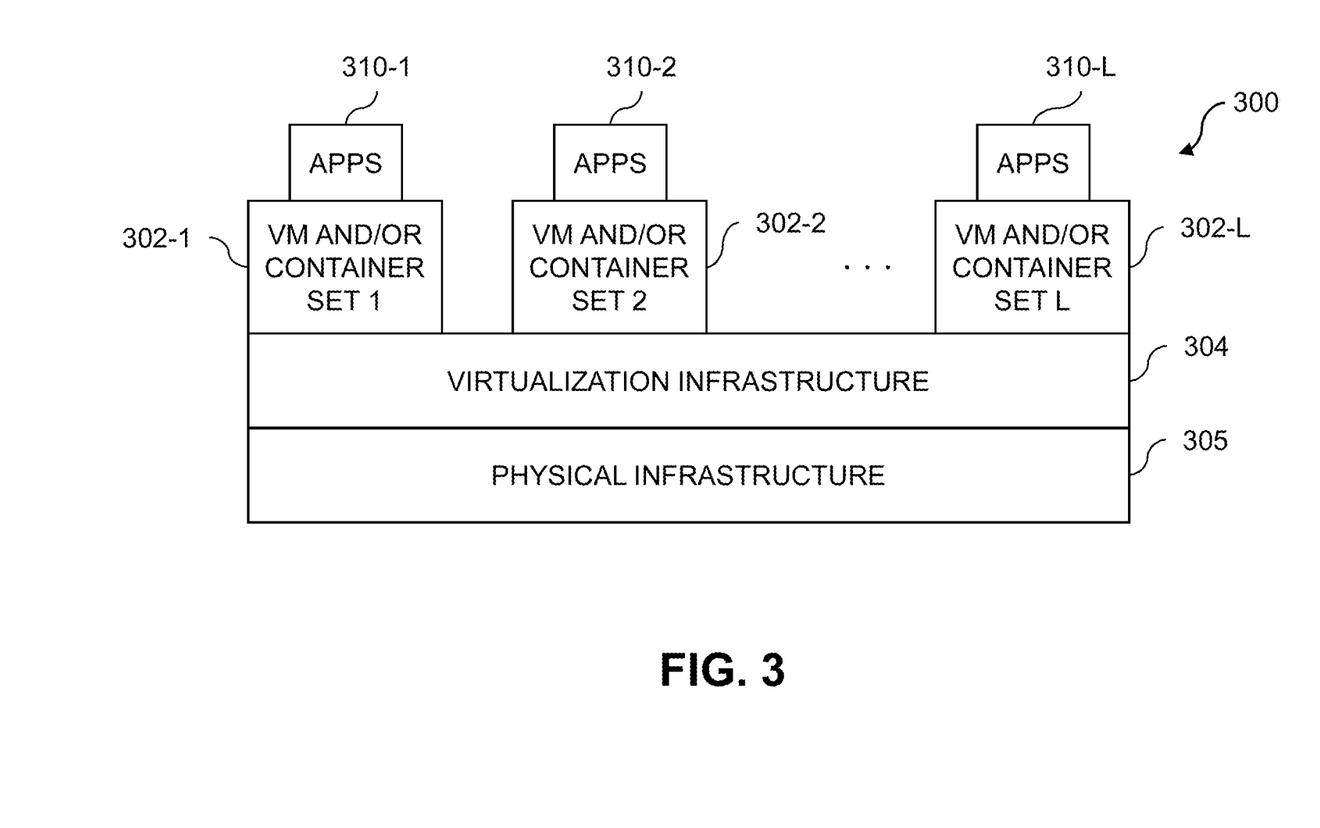
FIGS. 3 and 4 show examples of processing platforms that may be utilized to implement at least a portion of an information processing system in illustrative embodiments.
Figure 4:
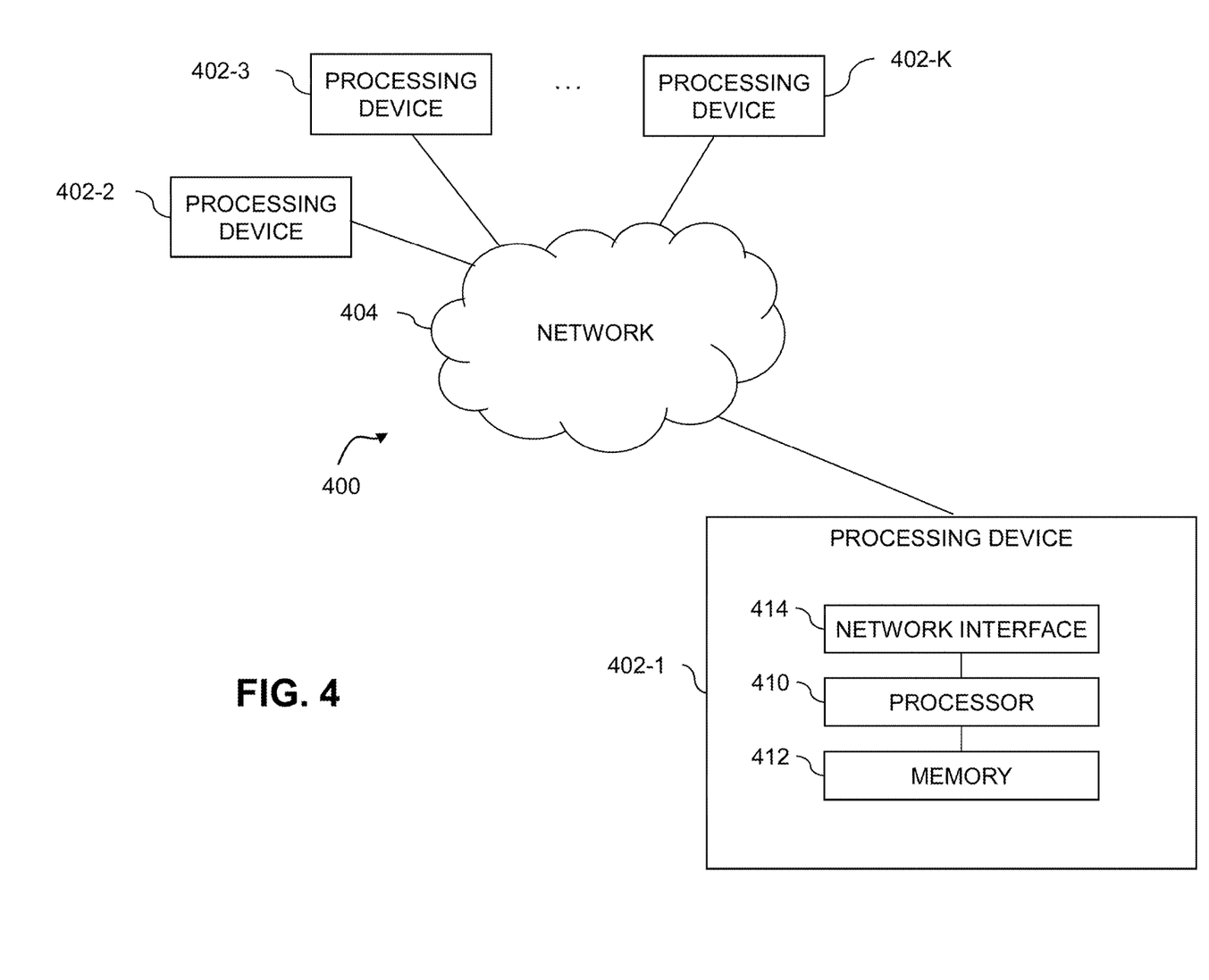

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. An example of a hypervisor platform that may be used to implement a hypervisor within the virtualization infrastructure 304 is the VMware® vSphere® which may have an associated virtual infrastructure management system such as the VMware® vCenter™. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 412 may comprise RAM, read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for movement of data between different types of storage based at least in part on the sizes of indexes in an indexing data structure maintained for the stored data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, indexing structures, page replacement policies, storage retention policies, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    obtaining data from a plurality of data sources in an enterprise system, the obtained data being associated with an n-gram indexing data structure;
    storing at least a portion of the obtained data from the plurality of data sources in a first storage having a first set of read and write access times, the stored data comprising one or more n-gram strings;
    estimating frequencies of occurrence of respective ones of the one or more n-gram strings in the stored data, a given one of the estimated frequencies of occurrence of a given one of the one or more n-gram strings being based at least in part on a size of a given n-gram index in the n-gram indexing data structure, the given n-gram index corresponding to the given n-gram string;
    in response to detecting one or more designated conditions, selecting a portion of the stored data based at least in part on the estimated frequencies of occurrence;
    and moving the selected portion of the stored data from the first storage having the first set of read and write access times to a second storage having a second set of read and write access times slower than the first set of read and write access times;
    wherein the method is performed by at least one processing device comprising a processor coupled to a memory.

2. The method of claim 1 wherein the plurality of data sources are associated with one or more assets in an enterprise system monitored by a monitoring system.

3. The method of claim 2 wherein the one or more assets comprise at least one of: one or more physical computing resources; and one or more virtual computing resources.

4. The method of claim 1 wherein the data obtained from the plurality of data sources comprises a plurality of log messages collected by a log message concentrator.

5. The method of claim 1 wherein the one or more designated conditions comprises determining that free space in the first storage is below a first threshold.

6. The method of claim 5 wherein the first storage comprises physical memory and the second storage comprises one or more designated portions of one or more storage devices providing virtual memory.

7. The method of claim 6 wherein determining that the free space in the first storage is below the first threshold comprises determining that a portion of the physical memory allocated for storage of the obtained data from the plurality of data sources is full.

8. The method of claim 6 wherein selecting the portion of the stored data based at least in part on the estimated frequencies of occurrence comprises selecting one or more data pages, in the physical memory, comprising n-gram strings with estimated frequencies below a second threshold, and wherein moving the selected portion of the stored data comprises evicting the selected one or more data pages from the physical memory to the virtual memory.

9. The method of claim 8 wherein a distribution of n-gram strings in the obtained data from the plurality of data sources is non-uniform, and wherein the second threshold is set based at least in part on learning the distribution of the n-gram strings in the obtained data from the estimated frequencies of occurrence.

10. The method of claim 9 wherein the second threshold comprises an estimate frequency of less than two.

11. The method of claim 1 further comprising maintaining a hash table, of data pages in the first storage, comprising n-gram strings with estimated frequencies below a first threshold.

12. The method of claim 11 wherein:
    selecting the portion of the stored data based at least in part on the estimated frequencies of occurrence comprises selecting one or more of the data pages in the hash table;
    and moving the selected portion of the stored data comprises evicting the selected one or more data pages from the first storage to the second storage and removing the evicted one or more data pages from the hash table.

13. The method of claim 12 wherein the one or more designated conditions comprises determining that a size of the hash table exceeds a second threshold.

14. The method of claim 1 wherein selecting the portion of the stored data based at least in part on the estimated frequencies of occurrence is further based at least in part on access patterns to the stored data by one or more client devices.

15. A computer program product comprising a non-transitory processor-readable storage medium having stored therein program code of one or more software programs, wherein the program code when executed by at least one processing device causes the at least one processing device:
to obtain data from a plurality of data sources in an enterprise system, the obtained data being associated with an n-gram indexing data structure;
to store at least a portion of the obtained data from the plurality of data sources in a first storage having a first set of read and write access times, the stored data comprising one or more n-gram strings;
to estimate frequencies of occurrence of respective ones of the one or more n-gram strings in the stored data, a given one of the estimated frequencies of occurrence of a given one of the one or more n-gram strings being based at least in part on a size of a given n-gram index in the n-gram indexing data structure, the given n-gram index corresponding to the given n-gram string;
in response to detecting one or more designated conditions, to select a portion of the stored data based at least in part on the estimated frequencies of occurrence; and
to move the selected portion of the stored data from the first storage having the first set of read and write access times to a second storage having a second set of read and write access times slower than the first set of read and write access times.

16. The computer program product of claim 15 wherein:
the program code when executed further causes the at least one processing device to maintain a hash table, of data pages in the first storage, comprising n-gram strings with estimated frequencies below a first threshold;
selecting the portion of the stored data based at least in part on the estimated frequencies of occurrence comprises selecting one or more of the data pages in the hash table; and
moving the selected portion of the stored data comprises evicting the selected one or more data pages from the first storage to the second storage and removing the evicted one or more data pages from the hash table.

17. The computer program product of claim 16 wherein the one or more designated conditions comprises determining that a size of the hash table exceeds a second threshold.

18. An apparatus comprising:
at least one processing device comprising a processor coupled to a memory;
the at least one processing device being configured:
to obtain data from a plurality of data sources in an enterprise system, the obtained data being associated with an n-gram indexing data structure;
to store at least a portion of the obtained data from the plurality of data sources in a first storage having a first set of read and write access times, the stored data comprising one or more n-gram strings;
to estimate frequencies of occurrence of respective ones of the one or more n-gram strings in the stored data, a given one of the estimated frequencies of occurrence of a given one of the one or more n-gram strings being based at least in part on a size of a given n-gram index in the n-gram indexing data structure, the given n-gram index corresponding to the given n-gram string;
in response to detecting one or more designated conditions, to select a portion of the stored data based at least in part on the estimated frequencies of occurrence; and
to move the selected portion of the stored data from the first storage having the first set of read and write access times to a second storage having a second set of read and write access times slower than the first set of read and write access times.

19. The apparatus of claim 18 wherein:
the at least one processing device is further configured to maintain a hash table, of data pages in the first storage comprising n-gram strings with estimated frequencies below a first threshold;
selecting the portion of the stored data based at least in part on the estimated frequencies of occurrence comprises selecting one or more of the data pages in the hash table; and
moving the selected portion of the stored data comprises evicting the selected one or more data pages from the first storage to the second storage and removing the evicted one or more data pages from the hash table.

20. The apparatus of claim 19 wherein the one or more designated conditions comprises determining that a size of the hash table exceeds a second threshold.

* * * * *